US009621662B1

(12) United States Patent
Mukherji

(10) Patent No.: US 9,621,662 B1
(45) Date of Patent: Apr. 11, 2017

(54) SURFACING RELEVANT REVIEWS

(71) Applicant: Yelp Inc., San Francisco, CA (US)

(72) Inventor: Aditya Mukherji, San Francisco, CA (US)

(73) Assignee: Yelp Inc., San Francisco, CA (US)

(*) Notice: Subject to any disclaimer, the term of this patent is extended or adjusted under 35 U.S.C. 154(b) by 302 days.

(21) Appl. No.: 13/784,588

(22) Filed: Mar. 4, 2013

(51) Int. Cl.
*G06F 15/16* (2006.01)
*H04L 29/08* (2006.01)

(52) U.S. Cl.
CPC ................. *H04L 67/22* (2013.01)

(58) Field of Classification Search
CPC .... G06Q 30/02; G06Q 50/01; G06Q 30/0282; G06F 17/30864; G06F 17/3053; G06F 17/218; G06F 17/241; G06F 17/30648; G06F 17/30719; H04N 21/4756; H04L 67/22
USPC ........................................................ 709/204
See application file for complete search history.

(56) References Cited

U.S. PATENT DOCUMENTS

| | | | | |
|---|---|---|---|---|
| 7,822,631 B1 * | 10/2010 | Vander Mey et al. | ....... | 705/7.29 |
| 8,166,013 B2 * | 4/2012 | Bandaru | ............. | G06F 17/2745 707/705 |
| 8,170,971 B1 * | 5/2012 | Wilson | ..................... | G06N 3/02 455/457 |
| 8,676,596 B1 * | 3/2014 | Franson | ........................ | 705/1.1 |
| 8,719,283 B2 * | 5/2014 | Koski | ............... | G06F 17/30719 707/603 |
| 8,799,276 B1 * | 8/2014 | Hyatt | ................ | G06F 17/30867 707/723 |
| 8,812,505 B2 * | 8/2014 | Ishigami | ........... | G06F 17/30864 707/737 |
| 8,838,564 B2 * | 9/2014 | Sahni | ...................... | H04L 67/22 707/706 |
| 8,959,091 B2 * | 2/2015 | Kodialam | ......... | G06F 17/30722 707/723 |
| 9,002,852 B2 * | 4/2015 | Farahat | ............... | G06F 17/3089 707/740 |
| 9,009,096 B2 * | 4/2015 | Pinckney | ........................ | 706/52 |
| 9,015,148 B2 * | 4/2015 | White | ................. | G06F 17/3064 707/721 |
| 9,104,765 B2 * | 8/2015 | Osann, Jr. | ......... | G06F 17/30991 |
| 9,116,982 B1 * | 8/2015 | Stern | ................. | G06F 17/30707 |
| 9,235,646 B2 * | 1/2016 | Kapur | ............... | G06F 17/30867 |
| 9,275,170 B2 * | 3/2016 | Gross | ................ | G06F 17/30699 |
| 9,294,537 B1 * | 3/2016 | Zuccarino | ............... | H04L 67/02 |
| 9,384,345 B2 * | 7/2016 | Dixon | ..................... | G06F 21/50 |
| 9,489,464 B2 * | 11/2016 | Cone | ................ | G06F 17/30867 |

(Continued)

OTHER PUBLICATIONS

Amazon About Badges 2011.*

(Continued)

*Primary Examiner* — Melvin H Pollack
(74) *Attorney, Agent, or Firm* — Van Pelt, Yi & James LLP

(57) ABSTRACT

Techniques for surfacing relevant reviews are disclosed. In some embodiments, one or more reviews are annotated with one or more applicable tags. Annotations of reviews associated with a subject of interest are aggregated to identify an applicable insight into the subject of interest, and the identified insight is published on a page associated with the subject of interest, wherein the published insight includes an option to navigate to a subset of reviews associated with the subject of interest that are relevant to the insight.

28 Claims, 5 Drawing Sheets

(56) References Cited

U.S. PATENT DOCUMENTS

| | | | |
|---|---|---|---|
| 2008/0082499 A1* | 4/2008 | Koski | 707/3 |
| 2010/0153318 A1* | 6/2010 | Branavan | G06F 17/30705 706/12 |
| 2013/0138503 A1* | 5/2013 | Brown | G06Q 30/0246 705/14.45 |
| 2013/0297581 A1* | 11/2013 | Ghosh | G06F 17/30864 707/706 |
| 2014/0136508 A1* | 5/2014 | Lyngbaek | G06F 17/30887 707/709 |
| 2015/0220836 A1* | 8/2015 | Wilson | G06Q 30/0631 706/46 |
| 2016/0004711 A1* | 1/2016 | Soon-Shiong | G06Q 30/02 715/205 |

OTHER PUBLICATIONS

Amazon Customer Reviews 2011.*
Patel, Sujan: "Step-by-Step SEO: How to setup Google+ Authorship", Nov. 6, 2012.*
Amazon customer reviews: QuickBooks Pro 2010, Oct. 2, 2010.*

* cited by examiner

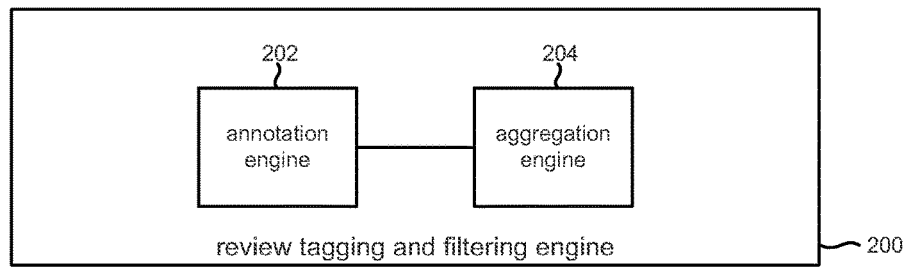
FIG. 2A
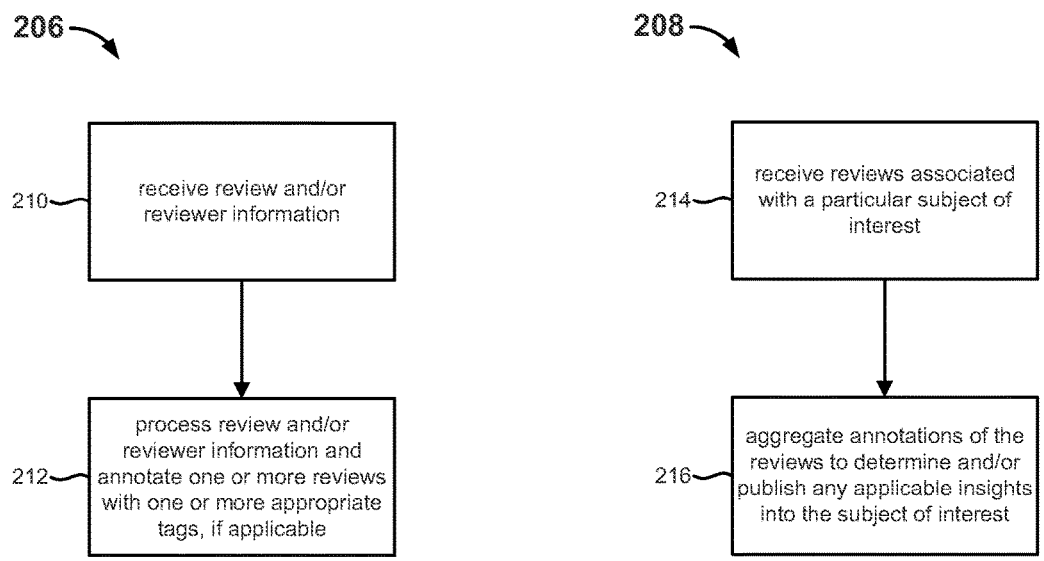
FIG. 2B
FIG. 2C

SURFACING RELEVANT REVIEWS

BACKGROUND OF THE INVENTION

A user considering a set of reviews may have difficulty in locating reviews addressing a particular concern or topic of interest. Moreover, searching the set of reviews using search queries associated with the particular concern or topic of interest may not always surface the relevant reviews.

BRIEF DESCRIPTION OF THE DRAWINGS

Various embodiments of the invention are disclosed in the following detailed description and the accompanying drawings.

FIG. 2A is a block diagram illustrating an embodiment of a review tagging and filtering engine.

FIG. 2B is a flow chart illustrating an embodiment of a process that may be employed by a tagging and filtering engine.

FIG. 2C is a flow chart illustrating an embodiment of a process that may be employed by a tagging and filtering engine.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
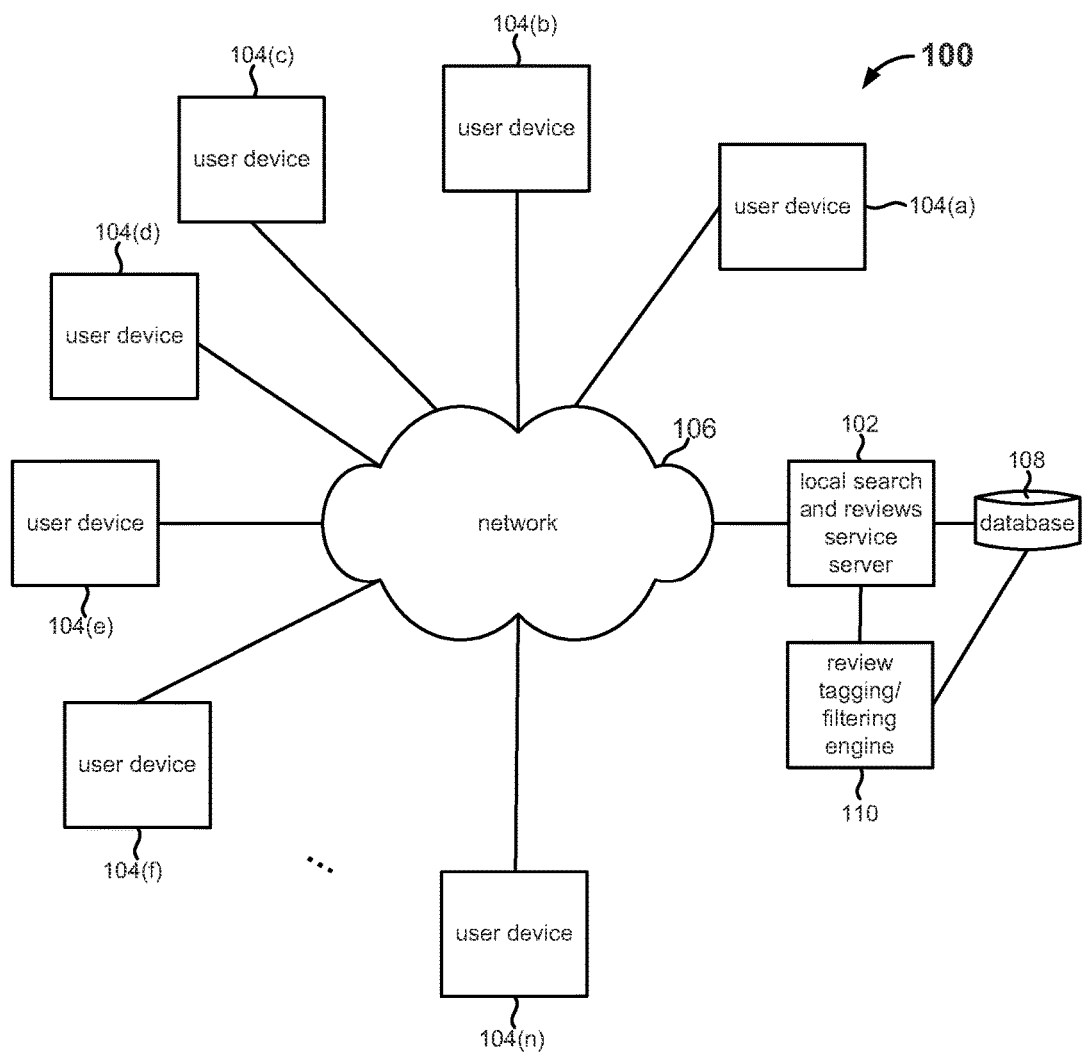
FIG. 1 is a block diagram illustrating an embodiment of a network environment in which a local search and reviews service is deployed.

FIG. 1 is a block diagram illustrating an embodiment of a network environment 100 in which a local search and reviews service is deployed. The local search and reviews service provides a framework for acquiring and posting user reviews and ratings as well as publishing other information associated with various subjects of interest, such as businesses, service providers, places or locations, products, etc. The local search and reviews service is served by server 102 and is accessible to users via any computing device 104 capable of communicating with server 102, such as a desktop computer, notebook computer, tablet computer, personal or enterprise digital assistant, mobile phone, etc. In various embodiments, the service may be accessed by a user device 104 via a client-side application and/or via a web interface such as a web browser. Communication between server 102 and devices 104 is facilitated by network 106, which in various embodiments may comprise any combination of one or more public, private, wired, and/or wireless networks, such as the Internet or a cellular network. The local search and reviews service includes database 108 populated with data such as published page data, user data, ad data, etc., as well as engine 110 for tagging and/or filtering reviews. Although depicted as single blocks in FIG. 1, the various components comprising the local search and reviews service (i.e., 102, 108, 110) may comprise any number of possibly networked components. For example, server 102 may be a part of a server farm.

A user considering reviews associated with a particular subject of interest is often presented with a large number of reviews associated with the subject of interest. The reviews may be sorted according to sorting parameters such as date, rating, reviewer reputation, or some other and possibly proprietary sorting algorithm. When presented with a large number of reviews, a user may be overwhelmed and find it difficult to locate reviews that address a particular topic or special interest. The user may be provided an option to search the set of reviews using keywords or search queries; however, the presented search results may not always provide the desired or relevant content.

Consider the following example scenario. A user viewing the business page of a restaurant published by an online local search and reviews service may be interested in determining whether the restaurant has good vegetarian options. In this example, the restaurant is not explicitly categorized as "vegetarian" on its business page. In order to determine whether good vegetarian options exist at the restaurant, the user may attempt to read through reviews for the restaurant posted by other users. However, it may be very difficult for the user to find the relevant reviews, especially if a large number of reviews exist. The user may be provided with an option to search the set of reviews, e.g., using a search term such as "vegetarian"; however, the results of such a search may still not provide the most relevant content, e.g., the search results may include reviews with content such as "I'm so glad I'm not vegetarian". Furthermore, a vegetarian reviewer may not use the word "vegetarian" in their review. Thus, in this example, it would be very useful if the reviews relevant for vegetarians could be easily surfaced and presented to the user.

Techniques for surfacing reviews relevant to a particular interest group or demographic are disclosed. In some embodiments, a review is annotated with a relevant tag based on the reviewer who wrote the review, the content of the review, and/or the rating associated with the review. Tags associated with the reviews of a particular subject of interest are aggregated to deduce one or more insights into the subject of interest. In some embodiments, each such deduced insight is published as a badge (i.e., an electronic reward given to a subject of interest that meets the requirements of obtaining a badge, e.g., based on received reviews) or in another format on a page associated with the subject of interest. The badge may be selectable, easily allowing users to navigate to a subset of reviews relevant to the insight or topic associated with the badge. Annotating reviews with appropriate tags provides a means for indexing reviews and quickly filtering a set of reviews to present only subsets of reviews relevant to associated topics.

In the aforementioned restaurant example, for instance, a review of the restaurant having a positive rating and from a reviewer profiled as being vegetarian may be annotated with a tag such as "liked by vegetarians". If at least a threshold number of reviews with this tag exist for the restaurant, a badge that provides an associated insight is published on the business page of the restaurant. For example, the badge may provide an insight such as "vegetarians go nuts for this spot". In some embodiments, the badge includes a selectable hyperlink to navigate to a subset of reviews that have been tagged with the "liked by vegetarians" tag. Moreover, in some cases, a selectable hyperlink to navigate to a list of other businesses awarded the same badge and liked by the same interest group is provided. In the given example, selection of such a link navigates a user to other businesses liked by vegetarians and that have been awarded the "vegetarians go nuts for this spot" badge. Thus, by annotating reviews of the restaurant with appropriate tags and publishing selectable badges providing insights, a user is able to quickly navigate to a subset of relevant reviews and in some cases also to a listing of other businesses favored by the same demographic.

Although surfacing reviews relevant to vegetarians has been described in the given example, similar techniques may be employed to annotate reviews with any appropriate tags so that reviews relevant to various interest groups or demographics can be filtered and surfaced. In some embodiments, a tag and corresponding insight are based on an explicitly provided and/or implicit and/or inferred property, characteristic, or classification of a reviewer such as the age, gender, ethnicity, location, or some other potential characteristic of the reviewer. Examples of tags based at least in part on the reviewer profile or profiling and the aforementioned categorizations include "liked by 20 somethings", "liked by 30 somethings", "liked by senior citizens", "liked by men", "liked by women", "liked by Asians", "liked by locals", "liked by tourists", "liked by vegetarians", "liked by athletes", "liked by wine lovers", etc. In some embodiments, a tag and corresponding insight are based on the content of a review. For example, a review including specific content or keywords may be annotated with an appropriate tag such as "liked by people on a date", "liked by large parties", etc. In many cases, a review is annotated with an applicable tag based on an associated rating from the reviewer. For example, a review is annotated with an applicable "liked by" tag if the reviewer has rated the subject being reviewed at least three stars or higher in a five star rating system. Although many of the given examples comprise "liked by" tags, any other format for surfacing the negative or positive opinions of various interest groups and demographics may be employed in other embodiments. In one example, the format "average rating by demographic x is y" (e.g., "average rating by vegetarians is two stars") is employed so that both positive and negative opinions can be conveyed.

FIG. 2A is a block diagram illustrating an embodiment of a review tagging and filtering engine 200. In some embodiments, review tagging and filtering engine 200 comprises engine 110 of FIG. 1. As depicted, review tagging and filtering engine 200 includes annotation engine 202 and aggregation engine 204. Although depicted as single blocks in FIG. 2A, review tagging and filtering engine 200 may comprise a plurality of annotation engines 202 and/or aggregation engines 204. For example, review tagging and filtering engine 200 may include a dedicated annotation engine 202 and/or aggregation engine 204 configured for each different tag or tag type or category. FIGS. 2B-2C are flow charts illustrating embodiments of processes that may be employed by tagging and filtering engine 200. For example, process 206 of FIG. 2B may be employed by annotation engine 202, and process 208 of FIG. 2C may be employed by aggregation engine 204.

Review and/or reviewer information is received by annotation engine 202 at step 210 of process 206. At step 212, annotation engine 202 processes the received review and/or reviewer information and annotates one or more reviews with one or more appropriate tags as applicable. For example, the review may be annotated with a tag based on the reviewer who posted the review, the content of the review, and/or the rating posted with the review. In some embodiments, process 206 is iterated for different tags or tag types. Reviews may be annotated in any order and at any time by annotation engine 202 using process 206. For example, review annotation by annotation engine 202 using process 206 may be dynamically performed in real time when a review is received or performed offline any time after the review has been received. In some cases, an edited review is treated as a new review, and process 206 is repeated on the edited review.

Reviews associated with a particular subject of interest are received by aggregation engine 204 at step 214 of process 208. Aggregation engine 204 aggregates annotations of the reviews associated with the subject of interest to determine and/or publish any applicable insights into the subject of interest at step 216. For example, if a sufficient number of reviews associated with the subject of interest have been annotated with a prescribed tag, an insight corresponding to the tag is determined to be relevant and published as a badge or in another format on a page associated with the subject of interest by aggregation engine 204 at step 216. A mapping of a tag to a relevant insight and/or badge may be stored, for example, in a lookup table of database 108 of FIG. 1. The published badge may include a selectable or clickable option to navigate to a filtered subset of reviews of the subject of interest that are relevant to the insight or topic associated with the badge, i.e., to navigate to an aggregated subset of reviews annotated with the tag. In some cases, the published badge also includes a selectable or clickable option to navigate to other related subjects of interest, e.g., that have been awarded the same badge. Process 208 may be executed by aggregation engine 204 at any time. For example, process 208 may be executed by aggregation engine 204 after at least a threshold number of reviews have been collected for the subject of interest and may be periodically repeated, for instance, to account for new reviews and/or time variant trends.

Figure 3:
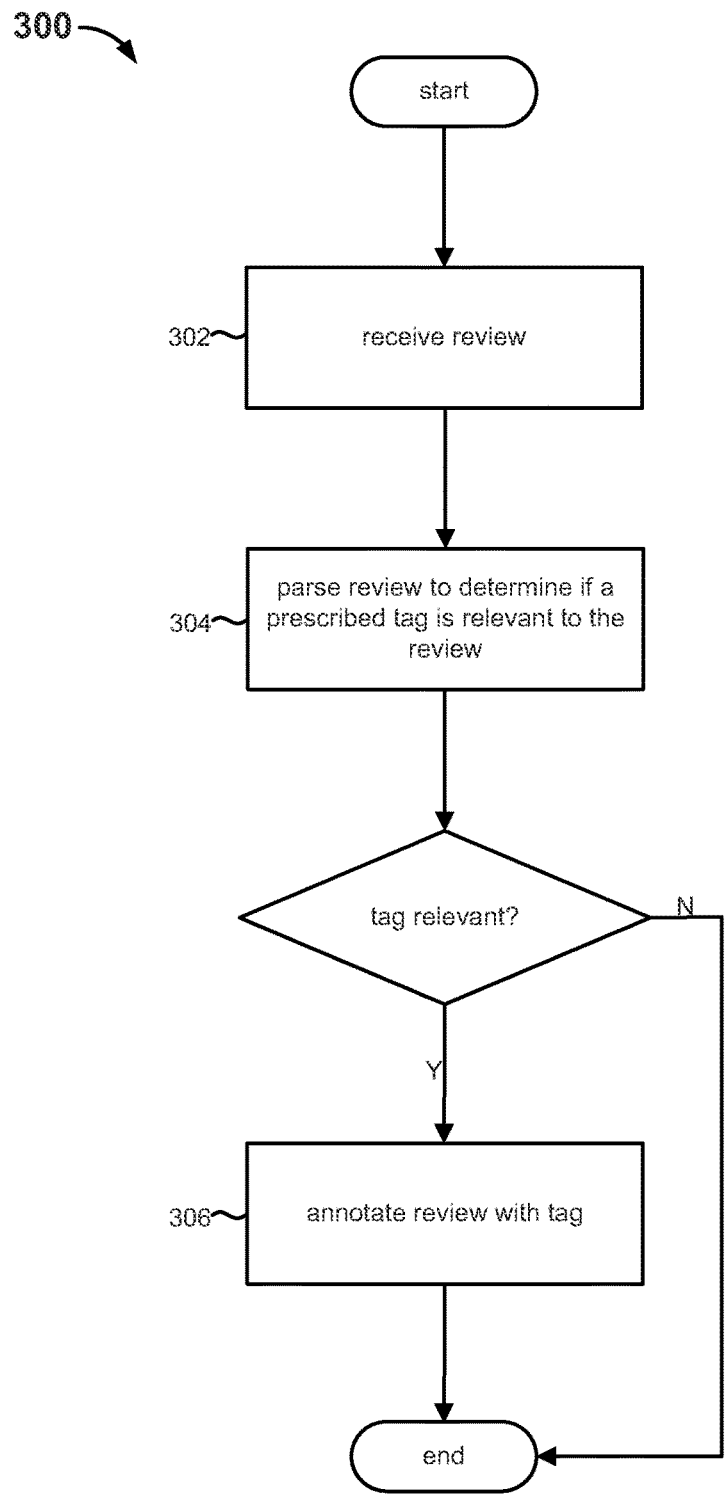
FIG. 3 is a flow chart illustrating an embodiment of a process for annotating a review with a tag.

FIG. 3 is a flow chart illustrating an embodiment of a process for annotating a review with a tag. In some embodiments, process 300 is employed by annotation engine 202 of FIG. 2A at step 212 of process 206 of FIG. 2B. Process 300 starts at step 302 at which a review is received. At step 304, the review is parsed to determine if a prescribed tag is relevant to the review. For example, the review text may be parsed to determine whether at least a threshold number of a prescribed list of terms, keywords, and/or phrases associated with the tag is included in the review. In addition to the content of the review, the relevancy of the tag may also be based on the reviewer and/or a rating posted with the review. The rating, for instance, may be used to identify whether the review is positive or negative. If the tag is determined to be relevant, the review is annotated with the tag at step 306. If the tag is determined not to be relevant, process 300 ends without annotating the review with the tag. As an example, consider using process 300 to determine whether the tag "liked by people on a date" is relevant to a restaurant review. In this example, the tag may be considered relevant if at least a threshold number of keywords associated with the tag (such as, for example, "date", "romantic", "candlelight", "anniversary", "valentine", etc.) appear in the review text and if a positive rating is associated with the review. If the tag is determined to be relevant, the review is annotated with the "liked by people on a date" tag. In various embodiments, process 300 may be modified to determine if any one or more of a set of tags of a particular category are relevant to a review and annotate the review accordingly. Although described for a single review and tag, process 300 may be similarly executed in parallel for a plurality of reviews and/or tags.

Figure 4:
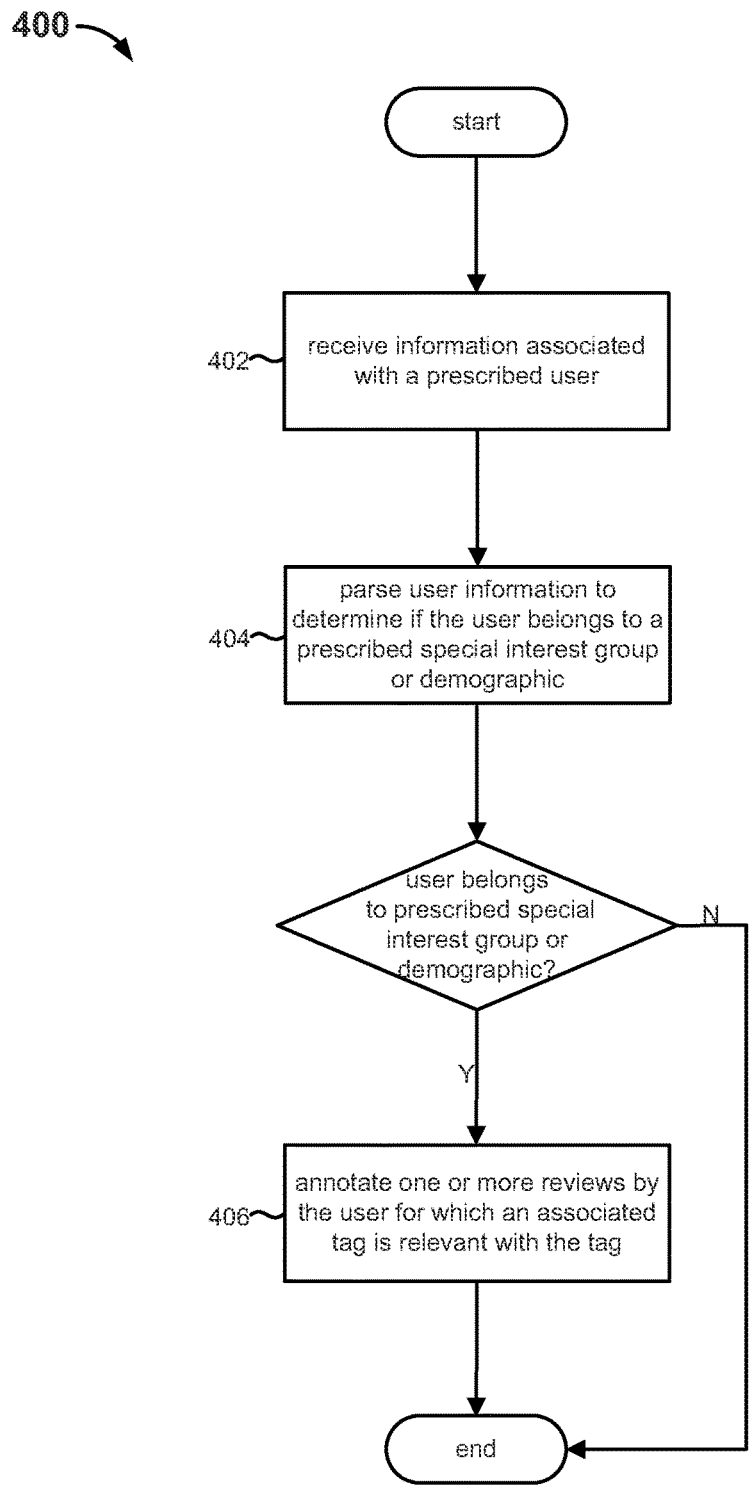
FIG. 4 is a flow chart illustrating an embodiment of a process for annotating a review with a tag.

FIG. 4 is a flow chart illustrating an embodiment of a process for annotating a review with a tag. In some embodiments, process 400 is employed by annotation engine 202 of FIG. 2A at step 212 of process 206 of FIG. 2B. Process 400 starts at step 402 at which information associated with a prescribed user is received. The user information may be explicitly provided by the user and/or may be implicit and/or inferred and may be sourced from and/or based on, for example, a user's associated account, reviews, ratings, tips, bookmarks, check-ins, browsing history, etc. At step 404, the user information is parsed to determine if the user belongs to a prescribed special interest group or demographic. The user may be determined to belong to the special interest group or demographic if relevant parts of the user information satisfy the requirements or thresholds for belonging to or being profiled as belonging to the special interest group or demographic. If it is determined that the user belongs to the special interest group or demographic under consideration, one or more reviews by the user for which a tag associated with the special interest group or demographic is relevant are annotated with the tag at step 406. If it is determined that the user does not belong to the special interest group or demographic under consideration, process 400 ends without annotating any of the user reviews with an associated tag. As an example, consider using process 400 to annotate reviews with the tag "liked by vegetarians". In this example, a user might be profiled as vegetarian if at least a threshold number of restaurant reviews by the user include keywords such as "vegetarian" and/or "vegan". If the user is profiled as being vegetarian, restaurant reviews by the user that have positive ratings are annotated with the "liked by vegetarians" tag. Note that reviews by the user for other types of businesses (such as hair salons, gyms, banks, etc.) are not annotated with the "liked by vegetarians" tag because the tag is only relevant to eateries. Although described for a single user and special interest group/demographic, process 400 may be similarly executed in parallel for a plurality of users and/or special interest groups/demographics.

Figure 5:
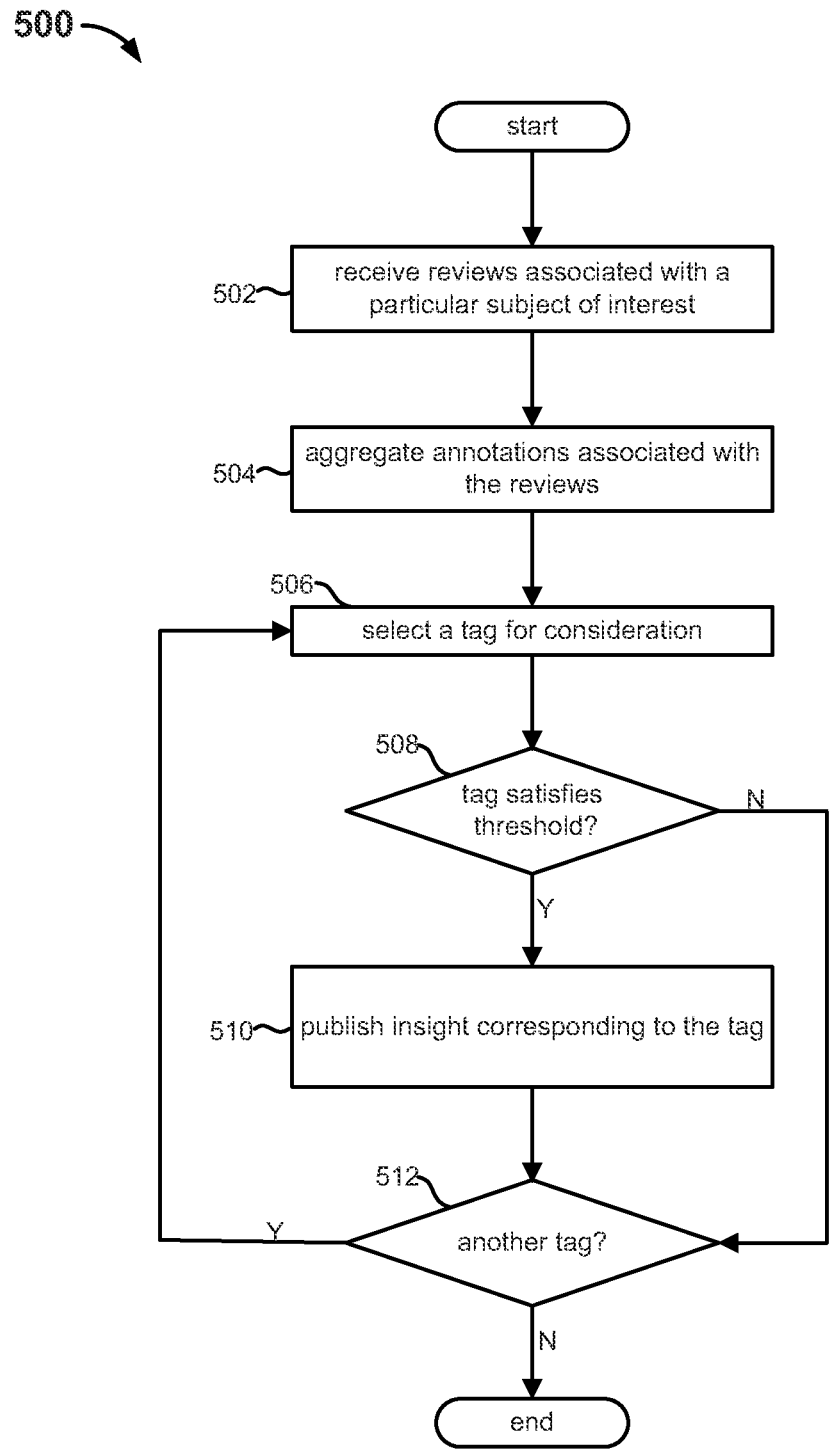
FIG. 5 is a flow chart illustrating an embodiment of a process for publishing an insight relevant to a set of reviews.

FIG. 5 is a flow chart illustrating an embodiment of a process for publishing an insight relevant to a set of reviews. In some embodiments, process 500 is employed by aggregation engine 204 of FIG. 2A at step 216 of process 208 of FIG. 2C. Process 500 starts at step 502 at which reviews associated with a prescribed subject of interest are received. At least some of the reviews are annotated with applicable tags. At step 504, annotations associated with the set of reviews are aggregated. For example, the different tags as well as the number of reviews annotated with each tag are determined at step 504. At step 506, a tag identified during the aggregation of step 504 is selected for consideration. At step 508, it is determined whether the number of reviews annotated with the tag under consideration satisfies a threshold. If it is determined at step 508 that the number of reviews annotated with the tag satisfies the threshold, an insight corresponding to the tag is published at step 510, for instance, on a page associated with the prescribed subject of interest. The insight may be published as a badge or in any other appropriate format and may include selectable options to navigate to a filtered or aggregated subset of reviews that are relevant to the insight (i.e., reviews annotated with the prescribed tag) and/or to other related subjects of interest (e.g., for which the same or a similar insight is applicable). At step 512, it is determined whether another tag remains to be considered. If it is determined at step 512 that another tag remains to be considered, process 500 continues with another tag at step 506. In some cases, different thresholds may be associated with different tags at step 508. If it is determined at step 512 that no other tags remain to be considered, process 500 ends. As an example, consider using process 500 to publish the "vegetarians go nuts for this spot" badge. In this example, if at least a threshold number of reviews of a restaurant are annotated with the "liked by vegetarians" tag, the "vegetarians go nuts for this spot" badge is published on the business page of the restaurant and includes selectable options to navigate to reviews annotated with the "liked by vegetarians" tag and/or to other businesses that have been awarded the same badge. In various embodiments, an insight published at step 510 may be generally published to all users or may at least in part be customized depending on the user. With respect to the aforementioned example, for instance, the "vegetarians go nuts for this spot" badge is in some embodiments only published on pages provided to users who have been profiled as being vegetarian.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    annotating one or more reviews with one or more applicable tags;
    aggregating annotations of reviews associated with a subject of interest to identify an applicable insight into the subject of interest; and
    publishing the identified insight determined from reviews of the subject of interest on a page associated with the subject of interest, wherein the published insight comprises a selectable hyperlink to navigate to pages of one or more other subjects of interest on which the same insight is published.

2. The method of claim 1, wherein annotating one or more reviews with one or more applicable tags comprises annotating a review based on one or more of reviewer data, review content, and review rating.

3. The method of claim 1, wherein annotating one or more reviews with one or more applicable tags comprises annotating a review with a tag if the review includes at least a threshold number of terms associated with the tag.

4. The method of claim 1, wherein annotating one or more reviews with one or more applicable tags comprises annotating one or more reviews posted by a reviewer with a tag associated with a special interest group or demographic to which the reviewer is determined to belong.

5. The method of claim 1, wherein annotating one or more reviews with one or more applicable tags comprises annotating a review with a tag based on a positive or negative rating provided with the review.

6. The method of claim 1, wherein aggregating annotations of reviews associated with the subject of interest comprises determining a set of associated tags and a number of reviews that are annotated with each different tag.

7. The method of claim 6, wherein identifying an applicable insight into the subject of interest comprises determining that a number of reviews annotated with a prescribed tag associated with the insight satisfies a threshold.

8. The method of claim 1, wherein publishing the identified insight comprises publishing the insight as a badge.

9. A system, comprising:
an annotation engine comprising a processor configured to annotate one or more reviews with one or more applicable tags; and
an aggregation engine comprising a processor configured to:
aggregate annotations of reviews associated with a subject of interest to identify an applicable insight into the subject of interest; and
publish the identified insight determined from reviews of the subject of interest on a page associated with the subject of interest, wherein the published insight comprises a selectable hyperlink to navigate to pages of one or more other subjects of interest on which the same insight is published.

10. The system of claim 9, wherein to annotate one or more reviews with one or more applicable tags comprises to annotate a review based on one or more of associated reviewer data, review content, and review rating.

11. The system of claim 9, wherein to annotate one or more reviews with one or more applicable tags comprises to annotate a review with a tag if the review includes at least a threshold number of terms associated with the tag.

12. The system of claim 9, wherein to annotate one or more reviews with one or more applicable tags comprises to annotate one or more reviews posted by a reviewer with a tag associated with a special interest group or demographic to which the reviewer is determined to belong.

13. The system of claim 9, wherein to annotate one or more reviews with one or more applicable tags comprises to annotate a review with a tag based on a positive or negative rating provided with the review.

14. The system of claim 9, wherein to aggregate annotations of reviews associated with the subject of interest comprises to determine a set of associated tags and a number of reviews that are annotated with each different tag.

15. The system of claim 14, wherein to identify an applicable insight into the subject of interest comprises to determine that a number of reviews annotated with a prescribed tag associated with the insight satisfies a threshold.

16. The system of claim 9, wherein to publish the identified insight comprises to publish the insight as a badge.

17. The system of claim 9, wherein the aggregation engine comprises the annotation engine.

18. A computer program product embodied in a non-transitory computer readable storage medium and comprising computer instructions for:
annotating one or more reviews with one or more applicable tags;
aggregating annotations of reviews associated with a subject of interest to identify an applicable insight into the subject of interest; and
publishing the identified insight determined from reviews of the subject of interest on a page associated with the subject of interest, wherein the published insight comprises a selectable hyperlink to navigate to pages of one or more other subjects of interest on which the same insight is published.

19. The method of claim 1, wherein the published insight comprises a selectable hyperlink to navigate to a subset of reviews associated with the subject of interest that is relevant to the insight.

20. The system of claim 9, wherein the published insight comprises a selectable hyperlink to navigate to a subset of reviews associated with the subject of interest that is relevant to the insight.

21. The computer program product of claim 18, wherein annotating one or more reviews with one or more applicable tags comprises annotating a review based on one or more of reviewer data, review content, and review rating.

22. The computer program product of claim 18, wherein annotating one or more reviews with one or more applicable tags comprises annotating a review with a tag if the review includes at least a threshold number of terms associated with the tag.

23. The computer program product of claim 18, wherein annotating one or more reviews with one or more applicable tags comprises annotating one or more reviews posted by a reviewer with a tag associated with a special interest group or demographic to which the reviewer is determined to belong.

24. The computer program product of claim 18, wherein annotating one or more reviews with one or more applicable tags comprises annotating a review with a tag based on a positive or negative rating provided with the review.

25. The computer program product of claim 18, wherein aggregating annotations of reviews associated with the subject of interest comprises determining a set of associated tags and a number of reviews that are annotated with each different tag.

26. The computer program product of claim 25, wherein identifying an applicable insight into the subject of interest comprises determining that a number of reviews annotated with a prescribed tag associated with the insight satisfies a threshold.

27. The computer program product of claim 18, wherein publishing the identified insight comprises publishing the insight as a badge.

28. The computer program product of claim 18, wherein the published insight comprises a selectable hyperlink to navigate to a subset of reviews associated with the subject of interest that is relevant to the insight.

\* \* \* \* \*